United States Patent
Paez et al.

(10) Patent No.: US 12,373,841 B1
(45) Date of Patent: Jul. 29, 2025

(54) ANTI-FRAUD TECHNOLOGY FOR PROCESSING OF FINANCIAL INSTRUMENTS

(71) Applicant: The PNC Financial Services Group, Inc., Pittsburgh, PA (US)

(72) Inventors: Jose Paez, Pittsburgh, PA (US); Michael Koester, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 18/666,321

(22) Filed: May 16, 2024

(51) Int. Cl.
 G06Q 20/40 (2012.01)
 G06Q 20/38 (2012.01)
 H04L 9/32 (2006.01)

(52) U.S. Cl.
 CPC ..... *G06Q 20/4016* (2013.01); *G06Q 20/3829* (2013.01); *H04L 9/3226* (2013.01)

(58) Field of Classification Search
 CPC .................. G06Q 20/00–425; H04L 9/00–50
 See application file for complete search history.

(56) References Cited

U.S. PATENT DOCUMENTS

| | | | |
|---|---|---|---|
| 7,040,539 | B1 | 5/2006 | Stover |
| 7,266,527 | B1 | 9/2007 | Martin |
| 8,789,167 | B2 | 7/2014 | Albani |
| 9,978,066 | B2 | 5/2018 | Song et al. |
| 2003/0005298 | A1* | 1/2003 | Smith ............ H04L 9/30 713/171 |
| 2003/0182241 | A1 | 9/2003 | Everhart |
| 2003/0225704 | A1* | 12/2003 | Park ............ G06Q 30/018 705/64 |
| 2004/0153417 | A1 | 8/2004 | Everhart |
| 2015/0073871 | A1 | 3/2015 | Hu et al. |
| 2015/0278819 | A1 | 10/2015 | Song et al. |
| 2016/0217464 | A1 | 7/2016 | Jajara et al. |
| 2017/0109837 | A1 | 4/2017 | Loganathan et al. |
| 2018/0012200 | A1 | 1/2018 | Dunn et al. |

OTHER PUBLICATIONS https://www.safechecks.com/check-writing-software/check-writing-software.php, Last accessed Jan. 21, 2025.

* cited by examiner

Primary Examiner — Mohammad A. Nilforoush
(74) Attorney, Agent, or Firm — K&L Gates LLP

(57) ABSTRACT

System and methods validate a tangible financial instrument, such as a paper check, that comprises printed or embedded thereon a readable security graphic. The readable security graphic is decodable to a public key or token for the tangible financial instrument. Each key/token can correspond to a financial instrument of an account of an account holder. A host server can retrieve a private key associated with the first account identifier. The host server can then compare the public key/token with the private key associated with the first account identifier. Upon a determination that the private key associated with the first account identifier is paired with the public key or token, the host system can generate and issue an approval notification for the tangible financial instrument. Conversely, the host system can issue a warning notification for the first tangible financial instrument if there is no match.

18 Claims, 12 Drawing Sheets

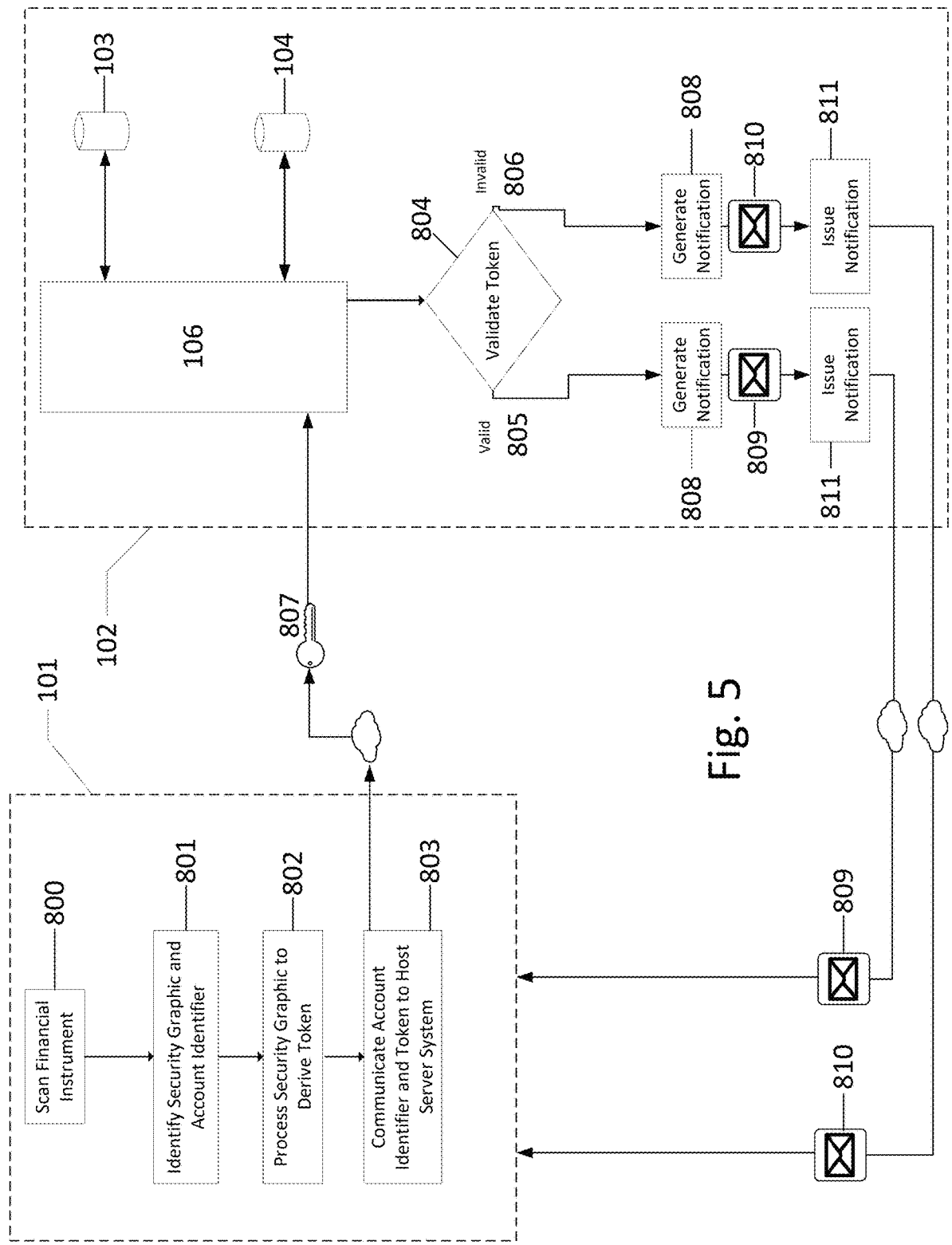

ANTI-FRAUD TECHNOLOGY FOR PROCESSING OF FINANCIAL INSTRUMENTS

FIELD

This disclosure relates generally to the field of fraud detection in the processing of financial instruments.

BACKGROUND

Check fraud has historically been a constant source of loss for financial institutions. The two most prevalent methods of check fraud consist of using color photocopiers or scanners to forge or alter otherwise valid checks, and using high-quality digital printers to create or counterfeit entirely fake checks. To combat this, financial institutions have employed a number of security measures. Current check fraud security measures typically rely on the detection of some physical component contained on, or hidden within, a physical check to authenticate the validity of the check.

For example, checks may contain an artificial watermark that is only visible to the human eye at a certain angle or under a certain type of light, e.g., fluorescent black light. Similar security measures utilize holograms, colored or fluorescent fibers, or various types of specialized inks. Additional security measures include specialized coatings applied to the surface of a check, raised-surface embossing, and specialized printing techniques. Although the foregoing security measures are effective at detecting fraud, they require that the verifying party, such as a bank, has actual physical possession of the check before they can verify it.

The proliferation of smartphones over the past decade has led to various forms of digital banking, most notably in the form of mobile deposit, which allows a payee to use a smartphone, or similarly capable device, to deposit a check without having to go to a physical bank. To deposit a check using mobile deposit, a payee uses a smartphone to take photographs of the front and back of a physical check, which are then immediately submitted to the payee's financial institution, and the payee receives a credit to their account shortly after for the amount of the mobile-deposited check.

Similarly, when a check issued by one financial institution is deposited at a different financial institution, such as when a payee belonging to Bank A cashes a check issued by Bank B, Bank A will scan an image of the check and then forward that image on to Bank B. Bank B will then process the image of the check, and shortly thereafter, deposit the amount due to the payee in the payee's account. This type of deposit typically occurs within a small number of days after Bank B has received the scanned image of the check from Bank A. Bank B will then typically receive the physical check from Bank A a number of weeks after the processing of the scanned image of the check from Bank A initially occurred.

When a check is deposited through either of the above methods, current anti-fraud measures are often rendered useless because the presence or validity of a typical physical security feature is not detectable from a scanned image of a check. As previously discussed, current security features typically require physical possession of the check to verify its validity, and as such, checks that are mobile-deposited are typically unable to be verified because a physical copy of the check is never sent to the issuing or processing financial institution(s). Similarly, as previously mentioned, when a physical check is cashed at a bank other than the issuing bank, the issuing bank often will not receive physical possession of the check until weeks after the check has been processed. It is possible for a check to be invalidated once the issuing bank finally obtains physical possession, however, banks typically have a limited window of time after the initial processing of the check in which to discover any form of check fraud. This window of time for fraud detection often expires before the issuing bank obtains physical possession of the check.

SUMMARY

In one general aspect, the present invention relates to system and methods for validating a first tangible financial instrument, such as a paper check. The system, in accordance with various embodiments, can comprise a first tangible financial instrument (e.g., a paper check) comprising printed or embedded thereon a readable security graphic. The readable security graphic can be decodable to a first public key for the first tangible financial instrument or a token for the first tangible financial instrument. An optical scanner can detect and scan the readable security graphics and account identifiers on the financial instruments so that the public key or the token, as case may be, for the first tangible financial instrument can be decoded. Each of the plurality of financial instrument public keys or tokens, as the case may be, can be for a financial instrument of an account of an account holder of a financial institution. A host server can retrieve a private key associated with the first account identifier. The host server can then compare the public key or token with the private key associated with the first account identifier. Upon a determination that the private key associated with the first account identifier is paired with the first public key or token, the host system can generate and issue an approval notification for the first tangible financial instrument. Conversely, the host system can issue a warning notification for the first tangible financial instrument if there is no match. Eliminating the need for the physical possession of a tangible financial instrument in order to validate it can allow financial institutions to confirm or deny validity of an instrument prior to releasing or depositing funds associated with the instrument. This can allow financial institutions to properly disperse or deposit funds for customers in a timely manner without having to worry about a check later be discovered as fraudulent when a physical copy of the check is finally received by the financial institution. Furthermore, such a system can allow financial institutions to validate financial instruments for which physical possession is not possible, such as checks deposited with a user device via a mobile deposit application. These and other benefits that can be realized through various embodiments of the present invention will be apparent from the description that follows.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which:

FIG. 5 is a flowchart diagram that illustrates a process flow of a method performed by a system for validating financial instrument, according to various embodiments of the present invention.

DETAILED DESCRIPTION

This disclosure relates to verifying the validity of financial instruments without requiring physical possession of the financial instruments. In general, aspects of the present invention relate to a system configured to detect and scan a readable security graphic contained in, or on, a financial instrument, identify a public key or token decodable from the scanned readable security graphic, identify an account identifier, compare the identified public key with a private key associated with the account identifier, compare and/or map the token to either the private key associated with the account identifier or to account identifying information, and generate a notification based upon the result of the comparison/mapping. If a comparison/mapping results in a success, the public key, token, and/or private key may be designated as used in their respective database(s), or the key(s)/token(s) may be removed from their database(s) entirely. The designation or removal of the key(s)/token(s) prevents the key(s)/token(s) from being copied and utilized in a future attempted fraud.

The present invention, in various embodiments, provides a system that allows for a financial instrument to be verified, or identified as fraudulent, at the time of processing the financial instrument, such as when depositing a check via mobile deposit, for example. The present invention, according to various embodiments, provides a system that allows a financial instrument to be verified at the time of processing, regardless of how the financial instrument is processed (e.g., mobile deposit), or who has physical possession of the financial instrument at the time of processing. Verifying validity of a financial instrument at the time of processing prevents financial institutions from processing fraudulent financial instruments that may never be discovered as fraudulent because either the financial institution never receives the physical financial instrument (e.g., mobile deposit), or the financial institution receives the physical financial instrument days or weeks after processing has already occurred. According to various embodiments of the present invention, a financial instrument verified by the system may be a tangible financial instrument, such as a physical check, or a digital financial instrument, such as a digital check.

Figure 1A:
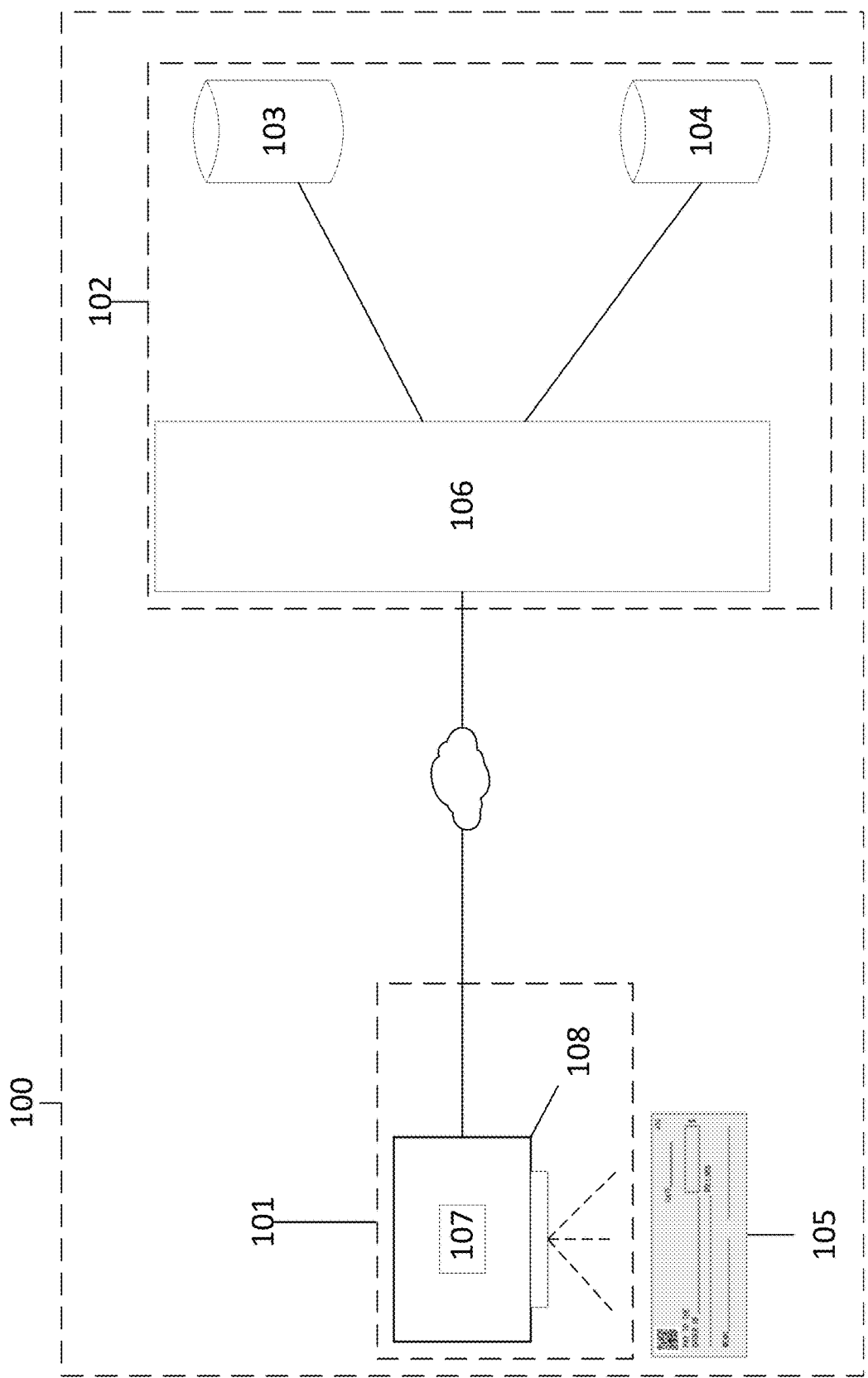
FIG. 1A is a diagram of a system for validating a financial instrument, according to various embodiments of the present invention.
Figure 1B:
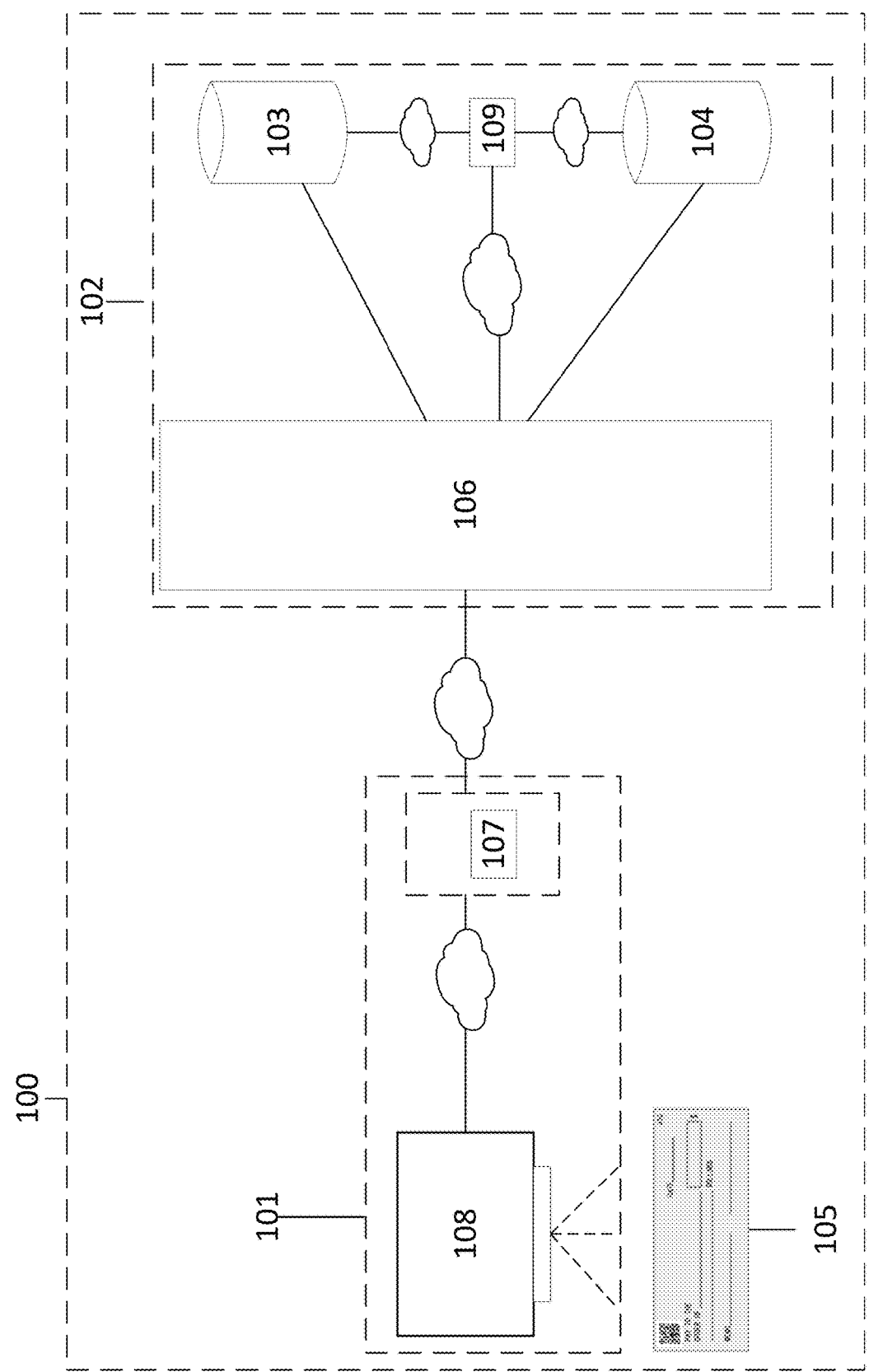
FIG. 1B is a diagram of a system for validating a financial instrument, according to various embodiments of the present invention.

With reference now to the figures, FIG. 1A and FIG. 1B depict a system 100 for validating a tangible financial instrument 105, according to various embodiments of the present invention. The system 100 can comprise, as shown in the example of FIG. 1A and FIG. 1B, a financial instrument validation system 101, a host server system 102, and a tangible financial instrument 105 comprising a readable security graphic. In some embodiments, the host server system 102 can comprise one or more servers, such as server 106, and one or more databases, such as a first database 103, and a second database 104. In some embodiments, the financial instrument validation system 101 can comprise a processor 107 and an optical scanner 108. The optical scanner 108 can comprise any suitable optical scanner, such as a camera, an optical character recognition scanner, or an optical mark recognition scanner.

In some embodiments, the financial instrument validation system 101 can comprise a dedicated or standalone financial instrument validation system, such as a security graphic reader, which may be utilized for validating financial instruments that are physically processed at a financial institution. In some embodiments, the financial instrument validation system 101 can comprise a mobile user device with imaging capabilities, such as a smartphone, which may be utilized for validating financial instruments that are digitally processed, e.g., mobile deposit banking.

According to various embodiments, the processor 107 can be in communication with the optical scanner 108 via a wired connection, a wireless connection, or both. In some embodiments, the processor 107 can be in remote communication with the optical scanner 108, as depicted in FIG. 1B. According to various embodiments, the financial instrument validation system 101 may be in communication with the host server system 102 via a wired connection, a wireless connection, or both. In some embodiments, the host server system 102 can further comprise a second processor 109 in communication with the first database 103 and the second database 104, as shown in FIG. 1B. The first database 103 and the second database 104, in accordance with various embodiments, may be stored on the same server 106 or on different servers within the server host system 102.

In accordance with various embodiments, the one or more databases of server system 102 can store public keys, tokens, private keys, and/or account identifiers. For example, in various embodiments, public keys may be stored in a first database, such as database 103, and private keys and account identifiers associated with private keys may be in a second database, such as database 104. In some embodiments, public keys may be stored in a first database, private keys may be stored in a second database, and account identifiers may be stored in a third database. In some embodiments, the host server system 102 can comprise a single database, such as database 103, and public keys, private keys, and account identifiers may all be stored within the single database.

In some embodiments, tokens may be stored in a first database, such as database 103, and private keys and account identifiers may be stored in a second database, such as database 104. In various embodiments, tokens may be stored in a first database, private keys may be stored in a second database, and account identifiers may be stored in a third database. In some embodiments, the host server system 102 can comprise a single database, such as database 103, and tokens, private keys, and account identifiers may all be stored within the single database. In some embodiments, tokens can be mapped to private keys and/or account identifiers in a database, such as databases 103 or 104. In some embodiments, token mapping may be stored in a first database and private keys and account identifiers may be stored in a second database. In some embodiments, token mapping may be stored on a first database, private keys may be stored on a second database, and account identifiers may be stored on a third database. In some embodiments, the host server system 102 can comprise a single database, and token mapping, private keys, and account identifiers can be stored within the single database. In various embodiments, the tokens, token mapping, private keys, and the account identifiers may be stored individually in separate databases or may be stored in various combinations in the one or more databases.

In accordance with various embodiments of the present invention, the financial instrument validation system 101 scans a tangible financial instrument 105 to identify an account identifier 203 (FIG. 2A) contained on a tangible financial instrument 105. In some embodiments, a tangible financial instrument 105 can be a tangible financial instrument, such as a check. In some embodiments, account identifying information of an account holder of a financial institution can be comprised of any suitable account identifying information, such as an account number, routing number, name of account holder, check number, etc. In some embodiments, an account identifier 203 can comprise multiple versions of account identifying information of an account holder of a financial institution, such as an account number, a check number, and a routing number. In some embodiments, an account identifier 203 can comprise one version of account identifying information of an account of a financial institution, such as an account number. In some embodiments, a readable security graphic 202 can be decodable to a public key. In some embodiments, a public key decodable from a readable security graphic 202 can be associated with a tangible financial instrument 105. In some embodiments, a readable security graphic 202 can be decodable to both a public key associated with a tangible financial instrument 105 and an account identifier 203 associated with a tangible financial instrument 105. In some embodiments, one or more account identifiers 203 may be contained in a readable security graphic 202, and one or more account identifiers 203 may be displayed in their standard format, e.g., a numeric account number (FIG. 2A), numeric routing number, etc.

In accordance with various embodiments, a readable security graphic 202 can be decodable to a token. In some embodiments, a token decodable from a readable security graphic 202 can be associated with a tangible financial instrument 105. In some embodiments, a readable security graphic 202 can be decodable to both a token associated with a tangible financial instrument 105 and an account identifier 203 associated with a tangible financial instrument 105.

Figure 2A:
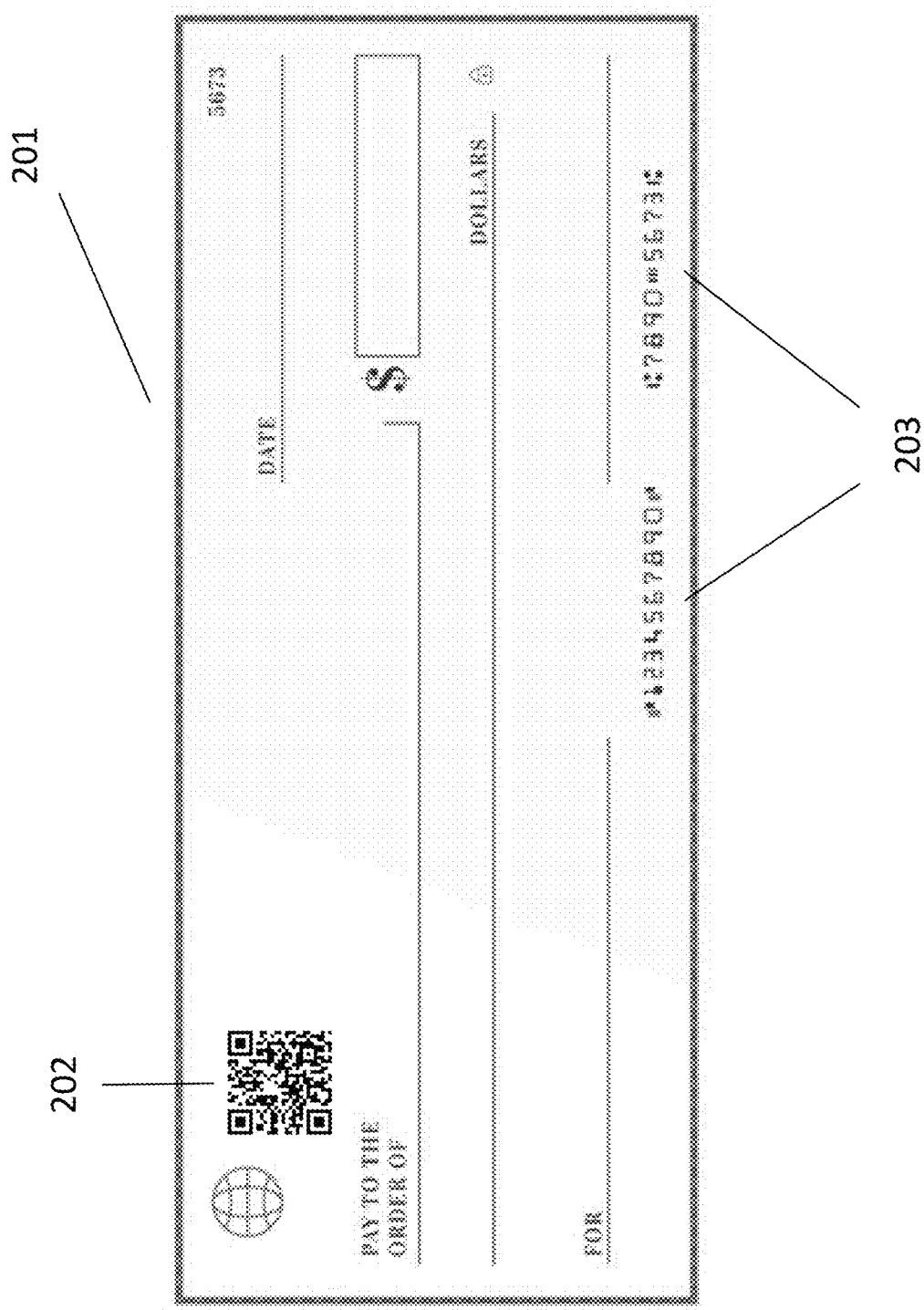
FIG. 2A is a diagram of a tangible financial instrument with a readable security graphic, according to various embodiments of the present invention.

FIG. 2A illustrates a tangible financial instrument 201 comprising a readable security graphic 202 and an account identifier 203. The readable security graphic 202, according to various embodiments, can comprise a quick response code ("QR code"), a hash string, or other suitable cryptographically encrypted security graphics. The readable security graphic 202 can be generated using a cryptographic hashing algorithm, such as SHA-256. In some embodiments, the readable security graphic 202 can comprise a single security graphic, e.g., a QR code. In some embodiments, the readable security graphic 202 can comprise multiple security graphics, e.g., multiple QR codes, a QR code and a hash string, multiple hash strings, or any combination thereof. In some embodiments, the account identifier 203 may be displayed in a non-encrypted standard format, e.g., routing number and account number, as illustrated in FIG. 2A.

Figure 2B:
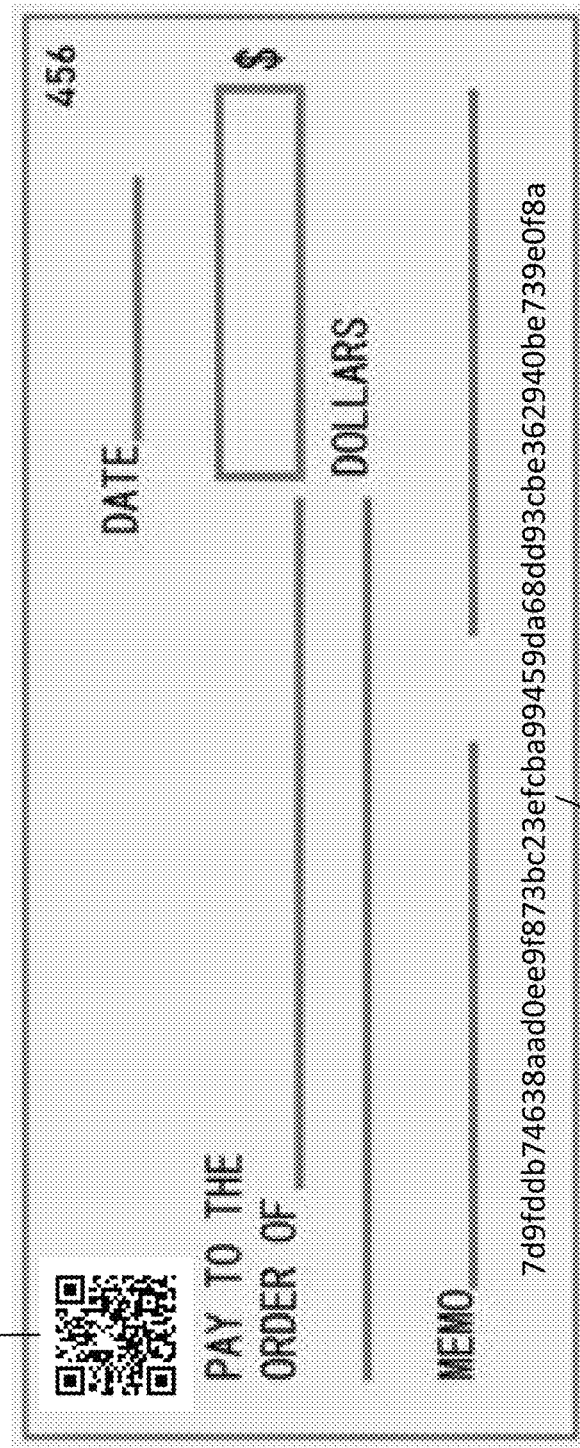
FIG. 2B is a diagram of a tangible financial instrument with multiple readable security graphics, according to various embodiments of the present invention.
Figure 2C:
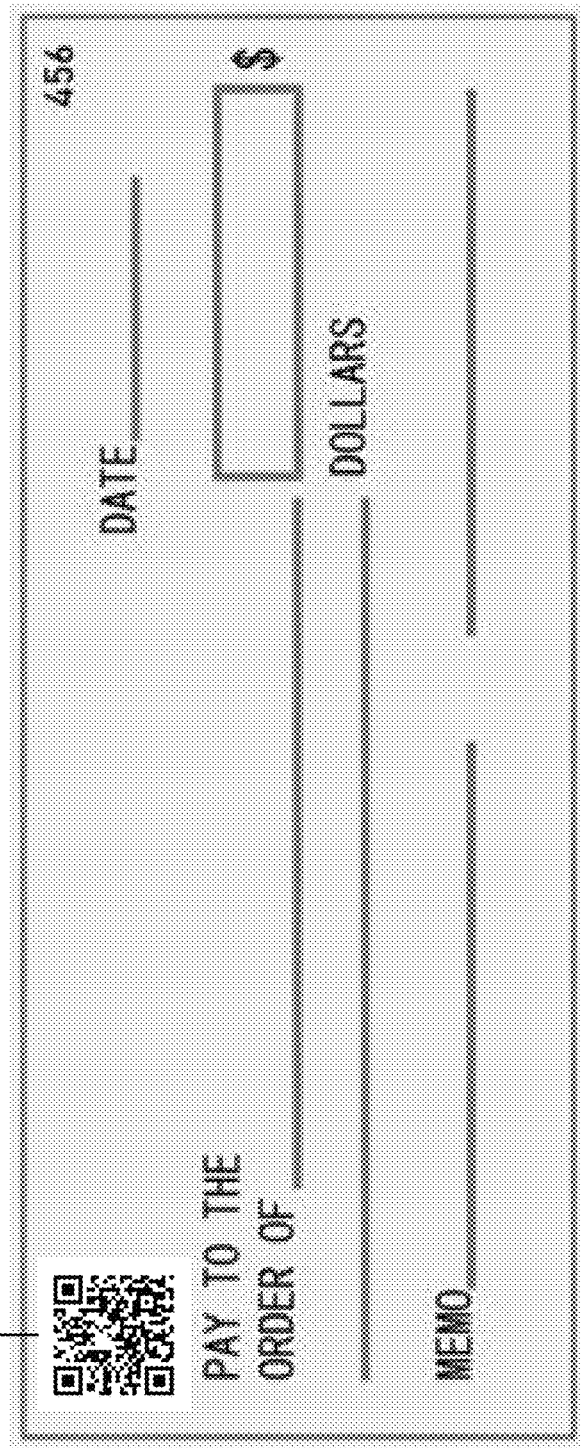
FIG. 2C is a diagram of a tangible financial instrument with a readable security graphic, according to various embodiments of the present invention.

FIG. 2B illustrates a tangible financial instrument 301 comprising readable security graphics 302 and 303. As mentioned above, the readable security graphics 302 and 303 can comprise multiple readable security graphics of the same type, e.g., multiple QR codes, in accordance with various embodiments of the present invention. In some embodiments, the readable security graphics 302 and 303 can comprise multiple readable security graphics of varying type, e.g., a QR code and a cryptographic hash string. FIG. 2B illustrates an embodiment of a tangible financial instrument 301 comprising a QR code readable security graphic 302, and a hash string readable security graphic 303. In some embodiments of the present invention, the readable security graphic 302 may contain a public key and the security graphic 303 may contain account identifying information, such as an account number, routing number, check number, and/or account holder name, etc. In some embodiments of the present invention, the readable security graphic 302 may contain a token, and the security graphic 303 may contain account identifying information, such as an account number, routing number, check number, and/or account holder name, etc. FIG. 2C illustrates a tangible financial instrument 401 comprising readable security graphic 402. In accordance with various embodiments, the readable security graphic 402 may contain a public key and account identifying information, such as an account number, routing number, check number, and/or account holder name, etc. In accordance with various embodiments, the readable security graphic 402 may contain a token and account identifying information, such as an account number, routing number, check number, and/or account holder name, etc.

Figure 2D:
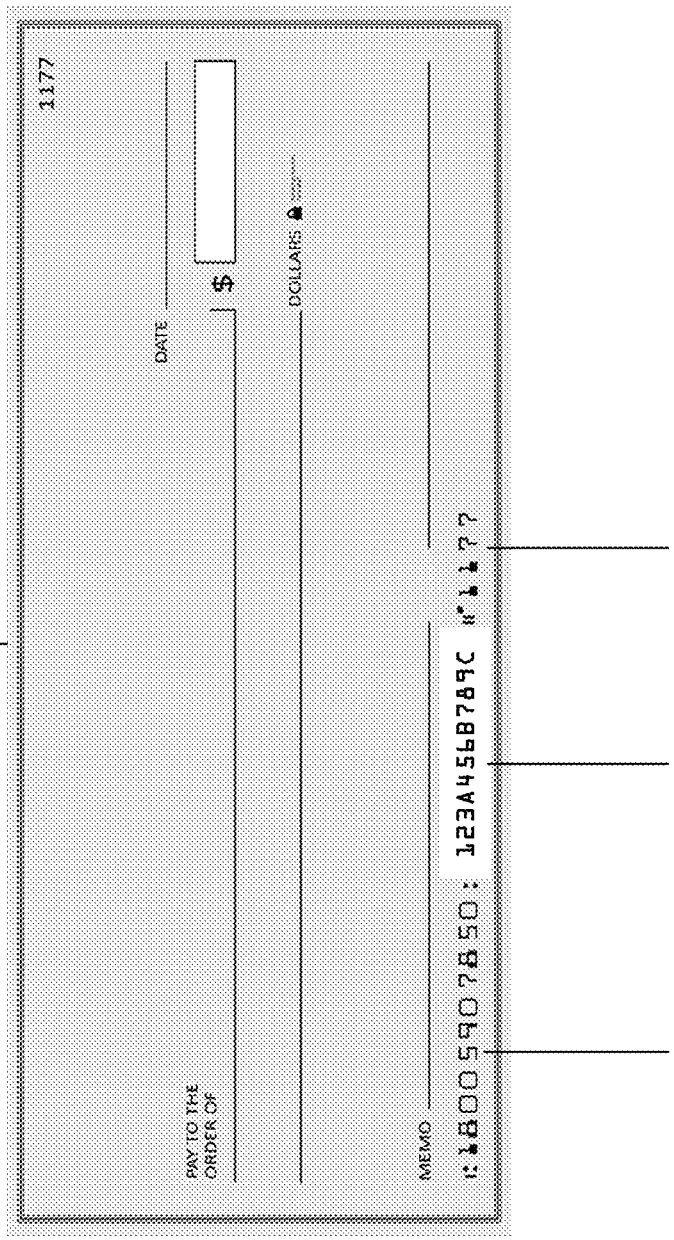
FIG. 2D is a diagram of a tangible financial instrument with a readable security graphic, according to various embodiments of the present invention.

FIG. 2D illustrates a tangible financial instrument 1101 comprising a hash string readable security graphic 1103. In some embodiments of the present invention, the hash string readable security graphic 1103 may contain a token and/or a public key. In accordance with various embodiments, the hash string readable security graphic 1103 may contain a token that contains tokenized account data such, such as an account number, routing number, check number, and/or account holder name, etc. That is, for example, the hash string readable security graphic 1103 can identify the account number and the specific check number for the financial instrument. In other embodiments, a token contained in the hash string readable security graphic 1103 identifies a single account identifier, such as an account number. Account identifying information contained in a token contained in a readable security graphic, such as hash string readable security graphic 1103, can be any suitable account identifying information, such as an account number, a check number, a routing number, an account holder name, etc. (e.g., account number and check number). In various embodiments, one or more account identifiers 1102, such as a routing number and/or check number, may be displayed on the tangible financial instrument 1101 in standard format, while one or more other account identifiers, such as an account number and/or check number may be tokenized and contained in a readable security graphic that is displayed on the tangible financial instrument 1201 as a readable security graphic, such as hash string readable security graphic 1103.

Figure 2E:
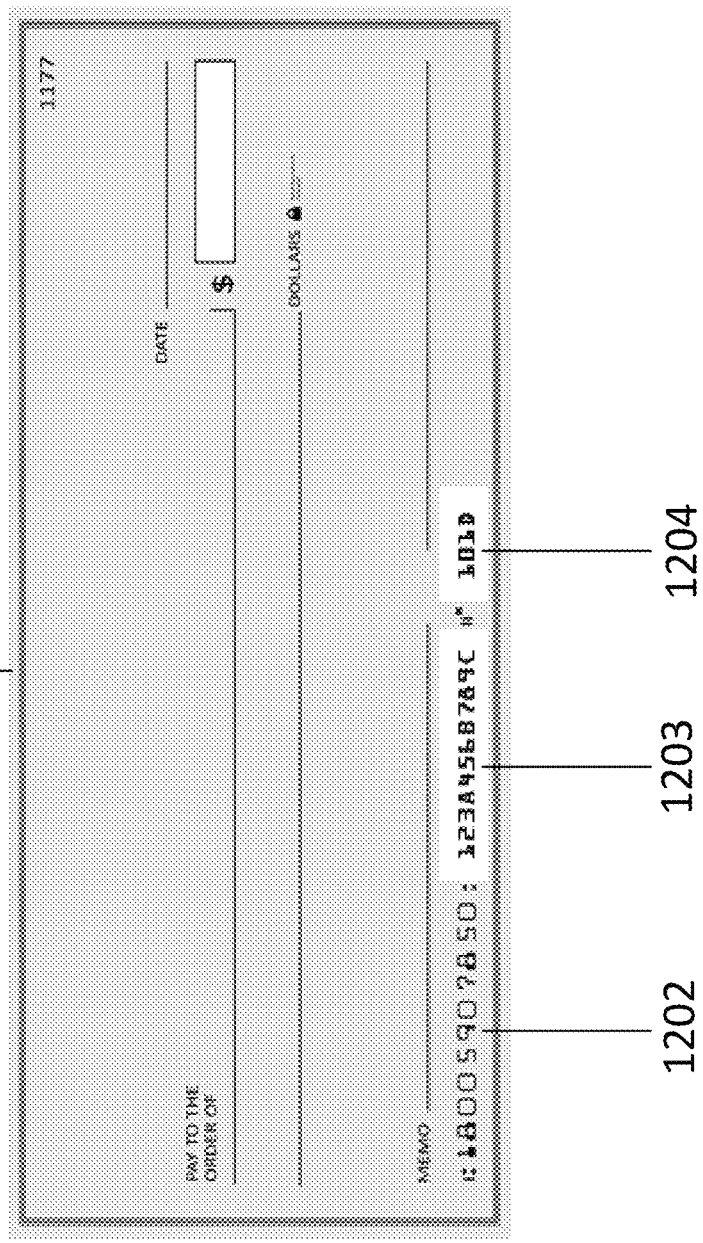
FIG. 2E is a diagram of a tangible financial instrument with a readable security graphic, according to various embodiments of the present invention.

FIG. 2E illustrates a tangible financial instrument 1201 comprising hash string readable security graphics 1203 and 1204. In various embodiments, the hash string readable security graphics 1203 and 1204 may each contain a token and/or public key. In accordance with various embodiments, a token contained in a hash string readable security graphic 1203 or 1204 may contain one or more tokenized account identifiers, such as the account number and the specific check number for the financial instrument. In accordance with various embodiments, hash string readable security graphics 1203 and 1204 may each contain a token, and each token may contain one or more tokenized account identifiers. In various embodiments, hash string readable security graphic 1203 may contain a first token that contains a first tokenized account identifier, such as an account number, while hash string readable security graphic 1204 may contain a second token that contains a second tokenized account identifier, such as a check number.

Figure 3:
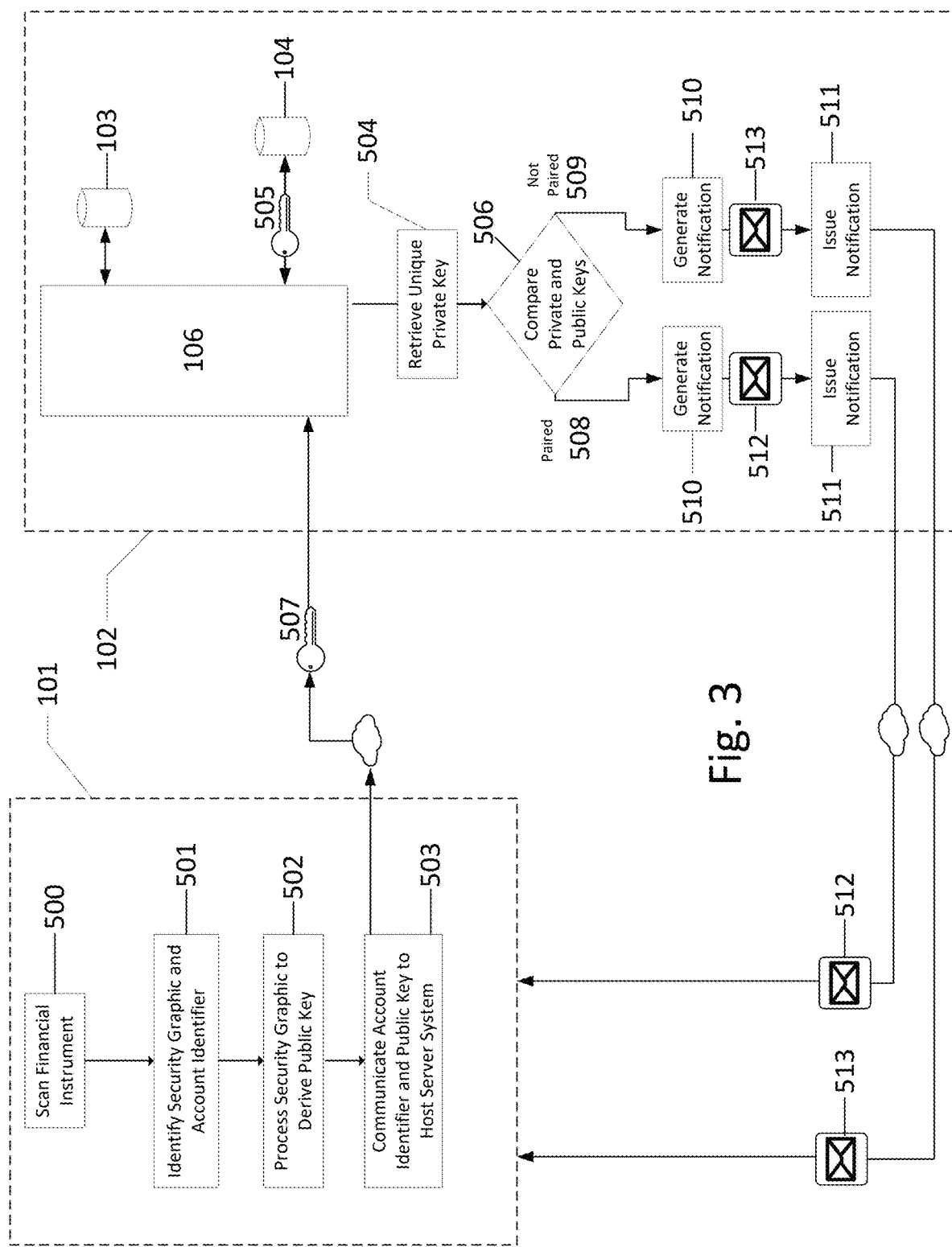
FIG. 3 is a flowchart diagram that illustrates a process flow of a method performed by a system for validating financial instrument, according to various embodiments of the present invention.

FIG. 3 illustrates an operation of a system for validating financial instruments. According to various embodiments of the present invention, the financial instrument validation system 101 scans 500 the tangible financial instrument 105 to identify 501 the readable security graphic 202 and account identifier 203 contained on the tangible financial instrument 105. The financial instrument validation system 101 then processes 502 the readable security graphic 202 to derive the public key 507 that is associated with the tangible financial instrument 105. The financial instrument validation system 101 then communicates 503 the account identifier 203 and the public key 507 with the host server system 102. The host server system 102 then retrieves 504, from the database 104, the private key 505 that is associated with the account identifier 203 contained on the tangible financial instrument 201 (e.g., routing and/or account number, public key, etc.). The host server system 102 then compares 506 the retrieved private key 505 with the public key 507 derived from the readable security graphic 202 contained on the tangible financial instrument 201.

If the comparison of the public key 507 and private key 505 determines that the keys are paired 508, the host server system 102 generates 510 an approval notification 512 and issues 511 the notification 512 back to the financial instrument validation system 101. If the comparison of the public key 507 and private key 505 determines that the keys are not paired 509, the host server system 102 generates 510 a warning or non-approval notification 513 and issues 511 the notification 513 back to the financial instrument validation system 101. In one embodiment of the present invention, once a public key 507 has been successfully matched with its corresponding private key 505, the public key 507 can be designated as used in the database in which it is stored, such as database 103. In one embodiment of the present invention, once a public key 507 has been successfully matched with its corresponding private key 505, the public key 507 can be removed from the database in which it is stored, such as database 103. In various embodiments, once a public key 507 has been successfully matched with its corresponding private key 505, the private key 505 may be designated as used in, and/or removed from, the database in which it is stored, such as database 104.

Figure 4:
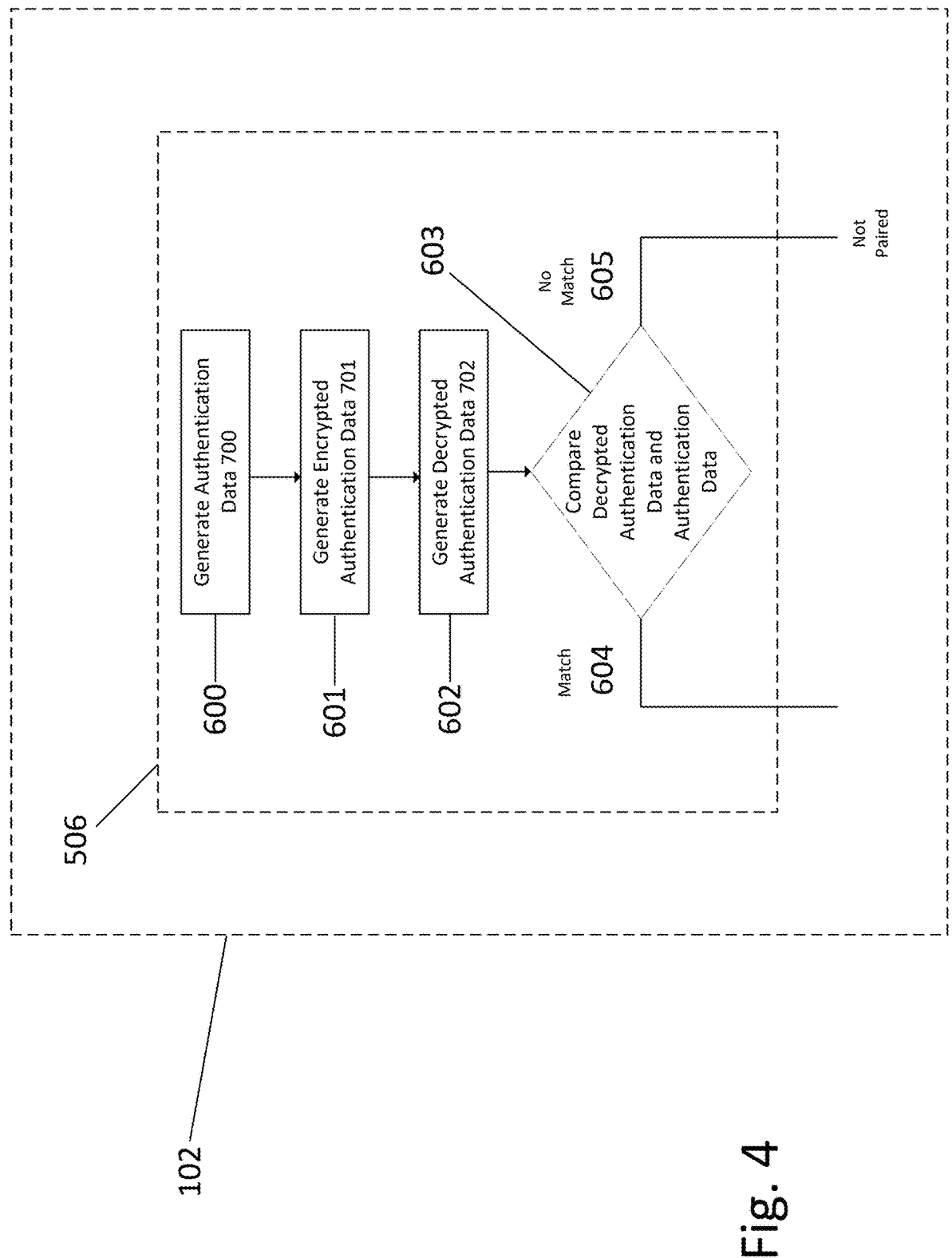
FIG. 4 is a flowchart diagram that illustrates a process flow of a method performed by a system for validating financial instrument, according to various embodiments of the present invention.

FIG. 4 illustrates an operation of a system for validating financial instruments. As discussed above, the financial instrument validation system 101 compares 506 a public key 507 derived from a readable security graphic 202 contained on a tangible financial instrument 201 with a private key 505 that is associated with an account identifier 203 contained on the tangible financial instrument 201. In accordance with various embodiments of the present invention, to compare a private key 505 and public key 507 and determine if the keys are paired or not paired, the host server system 102 generates 600 authentication data 700, then generates 601 encrypted authentication data 701, then generates 602 decrypted authentication data 702, and then compares 603 the decrypted authentication data 702 and the authentication data 700. If the comparison of the decrypted authentication data 702 and the authentication data 700 results in a match 604, the public key 507 and the private key 505 are determined to be paired 508. If the comparison of the decrypted authentication data 702 and the authentication data 700 results in a mismatch 605, the public key 507 and the private key 505 are determined to be not paired 509.

Further to the above, according to various embodiments of the present invention, the authentication data 700 can be any random data generated by the host server system 102, such as a string of alphanumeric and/or special characters, a sentence or message, or any other sufficient randomly generated and encryptable data. Similarly, according to various embodiments of the present invention, the authentication data 700 can be data already known by or communicated to/from the host server system 102 (i.e. not randomly generated), such as account and/or routing numbers contained within an account identifier 203 of a tangible financial instrument 201. To generate encrypted authentication data 701, the host server system 102 uses a public key 507 to encrypt the authentication data 700. Similarly, to generate decrypted authentication data 702, the host server system 102 uses a private key 505 to decrypt the encrypted authentication data 701.

In some embodiments, the public key 507 and the private key 505 can be part of a public-key infrastructure, or similar asymmetric cryptography systems or schemes. The public key 507 and the private key 505 can be cryptographically paired using cryptographic algorithms such as a Diffie-Hellman exchange, Elliptic Curve cryptography algorithms, etc. The public key 507 can be compared to the private key 505 using cryptographic digital signature verification, Ed448 signing algorithms, or any other suitable cryptographic key pair verification methods.

According to various embodiments, multiple private keys 505 may be associated with an account of an account holder of a financial institution. For example, if an account holder requests new checks or financial instruments from an issuing institution, the issuing institution may provide the account holder with a series of check or financial instrument books, each of which comprises multiple checks or financial instruments. Accordingly, in various embodiments, one individual check book issued for an account holder's account may be associated with one private key 505. In various embodiments, more than one individual check book issued for an account holder's account may be associated with one private key 505. According to various embodiments, one private key 505 can be cryptographically paired to multiple public keys 507. For example, in some embodiments, each individual check within a check book may contain its own public key 507, and each public key 507 from the checkbook can be cryptographically paired with the same private key 505 associated with the checkbook. In various embodiments, once all of the public keys 507 cryptographically paired with a private key 505 have been successfully matched with that private key 505, the private key 505 can be designated as used in, and/or removed from, the database in which it is stored, such as database 104.

FIG. 5 illustrates an operation of a system for validating financial instruments. According to various embodiments of the present invention, the financial instrument validation system 101 scans 800 the tangible financial instrument 105 to identify 801 the readable security graphic 202 and account identifier 203 contained on the tangible financial instrument 105. The financial instrument validation system 101 then processes 802 the readable security graphic 202 to derive a token 807 that is associated with the tangible financial instrument 105. The financial instrument validation system 101 then communicates 803 the token 807 derived from the readable security graphic 202 and the account identifier 203 with the host server system 102. The host server system 102 then validates 804 the token 807 derived from the readable security graphic 202.

If the validation 804 of the token 807 determines that the token 807 is valid 805, the host server system 102 generates 808 an approval notification 809 and issues 811 the notification 812 back to the financial instrument validation system 101. If the validation 804 of the token 807 determines that the token 807 is invalid 806, the host server system 102 generates 808 a warning or non-approval notification 810 and issues 811 the notification 812 back to the financial instrument validation system 101.

According to various embodiments, the token 807 can be part of a tokenization infrastructure. In some embodiments, the token 807 can be generated by using a cryptographic key, such as the private key 505 associated with the account identifier 203 contained on the tangible financial instrument 105, to tokenize tokenizable data 905. In some embodiments, the token 807 can be generated using random number generation to tokenize tokenizable data 905. In various embodiments, the tokenizable data 905 that is tokenized to generate the token 807 can be data that is associated with a tangible financial instrument 105 associated with an account of an account holder, such as the account identifier 203, the private key 505, and/or the public key 507. For example, in some embodiments, the tokenizable data 905 can be an account number associated with the tangible financial instrument 105. In some embodiments, the tokenizable data 905 can be random data, such as numeric, alphanumeric and/or special character data. In some embodiments, tokens 807 can be reversible or irreversible, and can be generated using cryptographic algorithms and keys, hashing functions, or any other suitable token generation methods.

In various embodiments, a token 807 that is associated with a tangible financial instrument 105 can be mapped, in a database, to a tokenizable data 905. In some embodiments, the tokenizable data 905 can be data associated with the tangible financial instrument 105, such as a private key 505 or account identifying information, such as an account identifier 203. In some embodiments, tokenizable data 905 that was used to generate a token 807 (i.e., data associated with the tangible financial instrument 105, random data, etc.) can be associated, in a database, with data associated with the tangible financial instrument 105, such as a private key 505 or account identifying information, such as an account identifier 203.

Figure 6A:
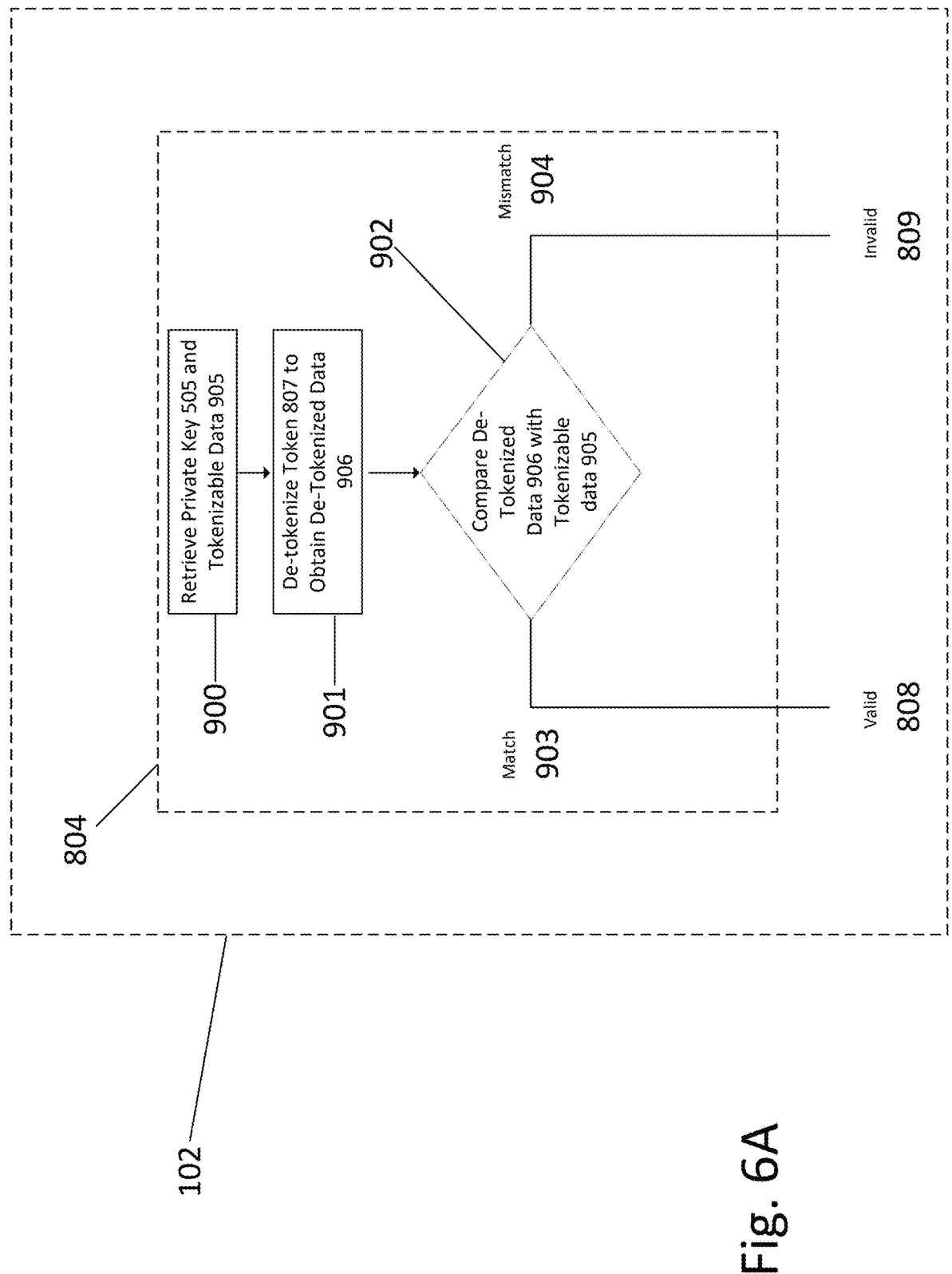
FIG. 6A is a flowchart diagram that illustrates a process flow of a method performed by a system for validating financial instrument, according to various embodiments of the present invention.

FIG. 6A illustrates an operation of a system for validating financial instruments. As discussed above, in some embodiments, a token 807 that is associated with a tangible financial instrument 105 is generated by tokenizing, with a private key 505 associated with the tangible financial instrument 105, tokenizable data 905, and the tokenizable data 905 may correspond to data that is associated with the tangible financial instrument 105, such as an account identifier 203. As mentioned above, in some embodiments, the tokenizable data 905 is associated, in a database, with the account identifier 203 associated with the tangible financial instrument 105. To validate 804 the token 807, the host server system 102 retrieves 900, from a database, the private key 505 and the tokenizable data 905 that is associated with the account identifier 203. The host server system 102 then de-tokenizes 901, with the private key 505, the token 807 to obtain de-tokenized data 906. The host server system 102 then compares 902 the de-tokenized data 906 with the tokenizable data 905. If the comparison of the de-tokenized data 906 and the tokenizable data 905 results in a match 903, the token 807 is determined to be valid 805. If the comparison of the de-tokenized data 906 and the tokenizable data 905 results in a mismatch 904, the token 807 is determined to be invalid 806.

Figure 6B:
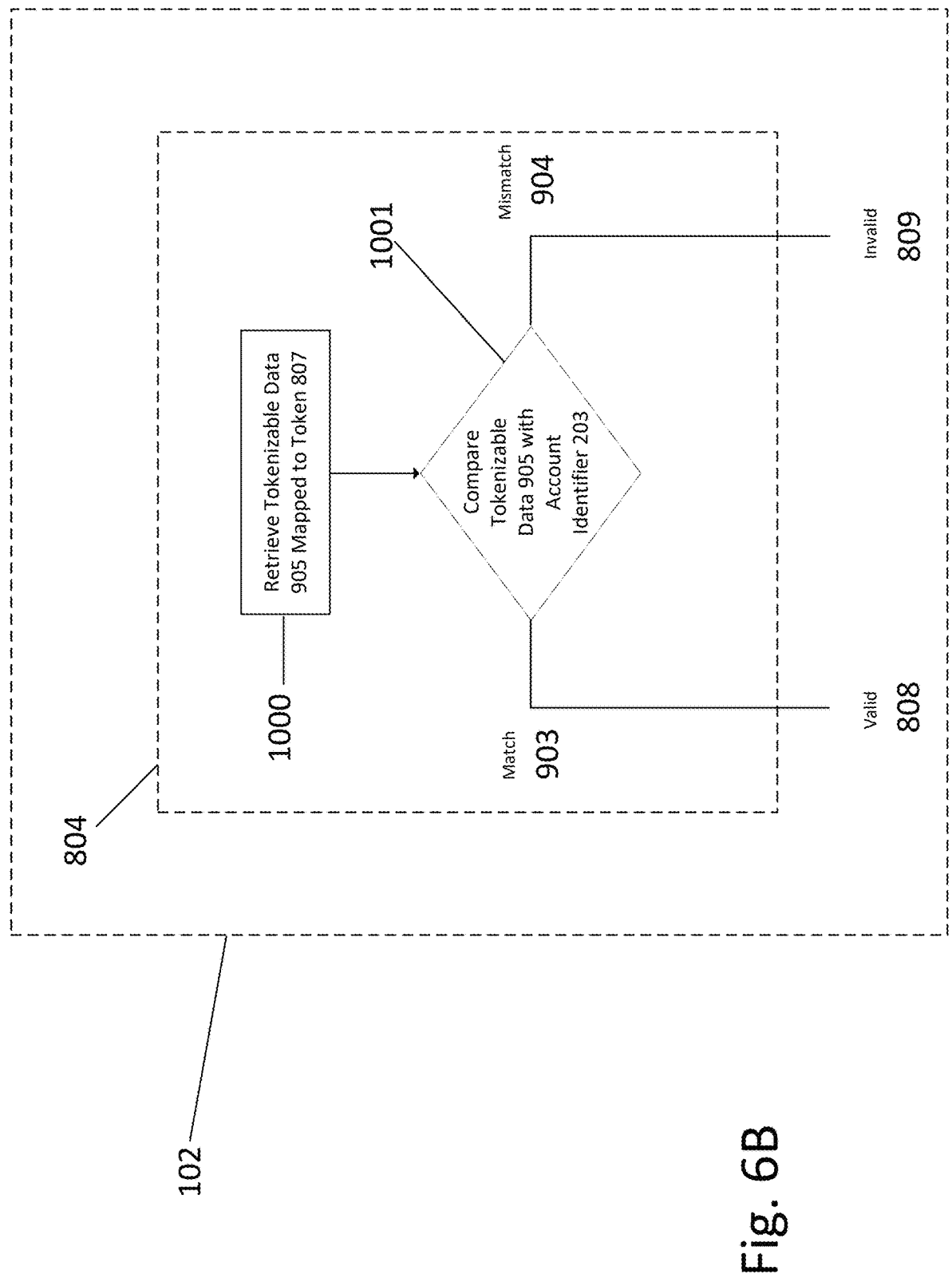
FIG. 6B is a flowchart diagram that illustrates a process flow of a method performed by a system for validating financial instrument, according to various embodiments of the present invention.

FIG. 6B illustrates an operation of a system for validating financial instruments. As discussed above, in some embodiments, a token 807 associated with a tangible financial instrument 105 is mapped, in a database, such as database 104, to tokenizable data 905. As discussed above, in some embodiments, the tokenizable data 905 can correspond to data that is associated with the tangible financial instrument 105, such as an account identifier 203 and/or private key 505. For example, in some embodiments, a token 807 associated with a tangible financial instrument 105 is mapped, in a database, to tokenizable data 905, and the tokenizable data 905 corresponds to an account identifier 203 associated with the tangible financial instrument 105. To validate 804 the token 807, the host server system 102 communicates with the database 104 to retrieve 1000 the tokenizable data 905 that is mapped, in database 104, to the token 807. The host server 102 then compares 1001 the retrieved tokenizable data 905 with the account identifier 203 associated with the tangible financial instrument 105 scanned by the financial validation system 101. If the comparison 1001 results in a match 903, then the token 807 is determined to be valid. If the comparison 1001 results in a mismatch 904, then the token 807 is determined to be invalid.

Further to the above, in some embodiments, the tokenizable data 905 corresponds to a private key associated with the tangible financial instrument 105. To validate 804 the token 807, the host server system communicates with the database to retrieve the tokenizable data 905 that is mapped, in a database, such as database 104, to the token 807. The host server system 102 then retrieves, from a database, such as database 103, the private key 505 that is associated, in database 103, with an account identifier 203 associated with the tangible financial instrument 105. The host server system 102 then compares the retrieved tokenizable data 905 with the retrieved private key 505. If the comparison results in a match, then the token 807 is determined to be valid. If the comparison results in a mismatch, then the token 807 is determined to be invalid.

Further to the above, in some embodiments, the tokenizable data 905 can correspond to random data that was used to generate the token 807. In some embodiments, the token 807 is mapped, in a first database, to the tokenizable data

905. In such embodiments, the tokenizable data 905 can be associated, in a second database, with data associated with a tangible financial instrument, such as an account identifier 203 and/or a private key 505. To validate 804 the token 807, the host server system 102 retrieves, from the first database, the tokenizable data 905 that is mapped, in the first database, to the token 807. The host server system 102 retrieves, from the second database, the tokenizable data 905 that is associated, in the second database, with data associated with the tangible financial instrument 105. The host server system 102 then compares the tokenizable data 905 retrieved from the first database with the tokenizable data 905 retrieved from the second database. In some embodiments, the token 807 may be mapped to the tokenizable data 905 in a first database, and the tokenizable data 905 may be associated with data associated with the tangible financial instrument 105 in the first database.

In various embodiments of the present invention, once the token 807 has been successfully validated, the token 807 can be designated as used in the database in which it is stored, such as database 103. In some embodiments, once the token 807 has been successfully validated, the token 807 can be removed from the database in which it is stored, such as database 103. In various embodiments, once the token 807 that is generated with, or mapped to, the private key 505 has been successfully validated, the private key 505 may be designated as used in, and/or removed from, the database in which it is stored, such as database 103. In some embodiments, a plurality of tokens 807 may be generated with, or mapped to, one private key 505. In such embodiments, once each token generated with, or mapped to, the private key 505 is validated, the private key 505 may be designated as used in, and/or removed from, the database in which it is stored.

In some embodiments, the system for validating a financial instrument 101 could be implemented with one processor 107. In embodiments where there are multiple processors 109, the processors could be co-located or distributed. For example, the processors may be interconnected by data networks, such as a LAN, WAN, the Internet, etc., using suitable wired and/or wireless data communication links. Data may be shared between the various processors using suitable data links, such as data buses (preferably high-speed data buses) or network links (e.g., Ethernet).

The system for validating a financial instrument 101 may be implemented with computer devices, such as servers, with appropriately programmed software that, when executed, causes the computer devices to perform the functions described herein. The computer systems may comprise one or more processor cores and one or more computer memory units. The memory may comprise primary (memory directly accessible by the processor, such as RAM, processor registers and/or processor cache) and/or secondary (memory not directly accessible by the processor, such as ROM, flash, HDD, etc.) data storage, to store computer instruction or software to be executed by the processor core(s), such as the software for the system for validating a financial instrument 101.

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to computer-implemented systems and methods for validating a financial instrument. In various embodiments, the system comprises a first tangible financial instrument comprising a first readable security graphic and a first account identifier. The first readable security graphic is decodable to a first public key for the first tangible financial instrument. The system also comprises a financial instrument validation system, which comprises an optical scanner configured to detect and scan readable security graphics and account identifiers on financial instruments. The financial instrument validation system further comprises a first processor in communication with the optical scanner. The first processor is configured to decode the first readable security graphic scanned by the optical scanner to identify the first public key for the first tangible financial instrument. The first processor can then identify the first account identifier scanned by the optical scanner. The first processor can then communicate the first public key and the first account identifier to a host server system.

The host server system comprises one or more servers in communication with the financial instrument validation system via an electronic data network. The one or more servers comprise one or more databases storing a plurality of financial instrument public keys, a plurality of private keys, and a plurality of account identifiers, where each of the plurality of financial instrument public keys is for a financial instrument of an account of an account holder of a financial institution, and where one or more of the plurality of financial instrument public keys is paired with a private key that is associated with the account of the account holder; where each of the plurality of account identifiers is associated with an account of an account holder of the financial institution, and where each of the private keys is associated in the one or more databases with one of the plurality of account identifiers.

The host server system further comprises a second processor in communication with the one or more databases. The second processor is configured to receive, from the financial instrument validation system, the first public key and the first account identifier; retrieve, from the one or more databases, the private key associated with the first account identifier and compare the private key associated with the first account identifier with the first public key. Upon a determination that the private key associated with the first account identifier is paired with the first public key, the second processor generates and issues an approval notification for the first tangible financial instrument. But upon a determination that the private key associated with the first account identifier is not paired with the first public key, the second processor generates and issues a warning notification for the first tangible financial instrument.

In another general aspect, the method of validating the financial instrument comprises the step of scanning, by an optical scanner of a financial instrument validation system, a first tangible financial instrument comprising a first readable security graphic and a first account identifier. The method also comprises the step of decoding, with a processor of the financial instrument validation system, the first readable security graphic scanned by the optical scanner to identify a first public key for the first tangible financial instrument. The method also comprises the step of identifying, by the processor, the first account identifier scanned by the optical scanner. The method also comprises the step of transmitting, via an electronic data network, by the financial instrument validation system, the first public key and the first account identifier to a host server system. The method also comprises the step of retrieving, by the host server system, from the one or more databases, the private key associated with the first account identifier. The method also comprises the step of comparing, by the host server system, the first private key associated with the first account identifier with the first public key. The method also comprises the step of determining, based on the comparing, that the first private key associated with the first account identifier is paired with the first public key. The method also comprises the step of generating, by the host server system, and issuing, by the host server system, an approval notification for the first tangible financial instrument.

In another general aspect, the method of validating the financial instrument comprises the step of scanning, by an optical scanner of a financial instrument validation system, a second tangible financial instrument comprising a second readable security graphic and a second account identifier. The method also comprises the step of decoding, with a processor of the financial instrument validation system, the second readable security graphic scanned by the optical scanner to identify a second public key for the second tangible financial instrument. The method also comprises the step of identifying, by the processor, the second account identifier scanned by the optical scanner. The method also comprises the step of transmitting, via an electronic data network, by the financial instrument validation system, the second public key and the second account identifier to a host server system. The method also comprises the step of retrieving, by the host server system, from the one or more databases, the second private key associated with the second account identifier. The method also comprises the step of comparing, by the host server system, the second private key associated with the second account identifier with the second public key. The method also comprises the step of determining, based on the comparing, that the second private key associated with the second account identifier is not paired with the second public key. The method also comprises the step of generating, by the host server system, and issuing, by the host server system, a warning notification for the second tangible financial instrument.

In various implementation of the systems and methods, the first readable security graphic comprises a quick response code printed on the first tangible financial instrument. In that connection, the first tangible financial instrument can comprise a check.

In various implementations of the systems and methods, the first readable security graphic comprises a hash string.

In various implementations of the systems and methods, the first readable security graphic comprises a quick response code and a hash string.

In various implementations of the systems and methods, the first account identifier comprises an account readable security graphic that is decodable to account identifying information associated with an account of an account holder.

In various implementations of the systems and methods, the plurality of private keys, the plurality of account identifiers, and the plurality of financial instrument public keys are stored on a first server of the host server system.

In various implementations of the systems and methods, the plurality of private keys and the plurality of account identifiers are stored on a first server of the host server system, and the plurality of public keys is stored on a second server of the host server system.

In various implementations of the systems and methods, the first public key is designated as used when a comparison of the first public key with the private key associated with the first account identifier determines that the first public key is paired with the private key associated with the first account identifier.

In accordance with various embodiments, the host server system comprises a second processor. The second processor is configured to generate a first authentication data. The second processor is further configured to generate a first encrypted authentication data by encrypting, with the first public key, the first authentication data. The second processor is further configured to decrypt, with the private key associated with the first account identifier, the first encrypted authentication data. The second processor is configured to compare the first decrypted authentication data with the first authentication data. The second processor is further configured to determine, based on a comparison match, that the first public key is paired with the private key associated with the first account identifier. The second processor is further configured to determine, based on a comparison mismatch, that the first public key is not paired with the private key associated with the first account identifier.

In one general aspect, the method of validating the financial instrument comprises the step of comparing, by the host server system, the first private key associated with the first account identifier with the first public key. The method also comprises the step of generating, by the host server system, a first authentication data. The method also comprises the step of generating, by the host server system, a first encrypted data by encrypting, with the first public key, the first authentication data. The method also comprises the step of generating, by the host server system, a first decrypted authentication data by decrypting, with the first private key associated with the first account identifier, the first encrypted authentication data. The method also comprises the step of comparing, by the host server system, the first decrypted authentication data with the first authentication data. The method also comprises determining, by the host server system, based on the comparing, that the first public key is paired with the first private key associated with the first account identifier.

In another general aspect, the method of validating the financial instrument comprises the step of comparing, by the host server system, the second private key associated with the second account identifier with the second public key. The method also comprises the step of generating, by the host server system, a second authentication data. The method also comprises the step of generating, by the host server system, a second encrypted data by encrypting, with the second public key, the second authentication data. The method also comprises the step of generating, by the host server system, a second decrypted authentication data by decrypting, with the second private key associated with the second account identifier, the second encrypted authentication data. The method also comprises the step of comparing, by the host server system, the second decrypted authentication data with the second authentication data. The method also comprises determining, by the host server system, based on the comparing, that the second public key is not paired with the second private key associated with the second account identifier.

In various embodiments, the system comprises a first tangible financial instrument comprising a first readable security graphic and a first account identifier. The first readable security graphic is decodable to a first token for the first tangible financial instrument. The system also comprises a financial instrument validation system, which comprises an optical scanner configured to detect and scan readable security graphics and account identifiers on financial instruments. The financial instrument validation system further comprises a first processor in communication with the optical scanner. The first processor is configured to decode the first readable security graphic scanned by the optical scanner to identify the first public key for the first tangible financial instrument. The first processor can then identify the first account identifier scanned by the optical scanner. The first processor can then communicate the first public key and the first account identifier to a host server system.

The host server system comprises one or more servers in communication with the financial instrument validation system via an electronic data network. The one or more servers comprises one or more databases storing a plurality of financial instrument tokens, a plurality of private keys, and a plurality of account identifiers, where each of the plurality of financial instrument tokens is for a financial instrument of an account of an account holder of a financial institution, and where each of the plurality of financial instrument tokens comprises a tokenizable data tokenized with a private key associated with the account of the account holder, and where each of the private keys is associated in the one or more databases with one of the plurality of account identifiers, and where the tokenizable data is associated in the one or more databases with at least one of the private keys associated with the account of the account holder or the account identifiers associated with the account of the account holder.

The host server system further comprises a second processor in communication with the one or more databases. The second processor is configured to receive, from the financial instrument validation system, the first token and the first account identifier; retrieve, from the one or more databases, the private key associated with the first account identifier and a first tokenizable data associated in the one or more databases with at least one of the private key associated with the first account identifier or the first account identifier; de-tokenize, with the private key associated with the first account identifier, the first token to obtain a first de-tokenized data; compare the first de-tokenized data with the first tokenizable data. Upon a determination that the first de-tokenized data matches the first tokenizable data, the second processor generates and issues an approval notification for the first tangible financial instrument. But upon a determination that the first de-tokenized data does not match the first tokenizable data, the second processor generates and issues a warning notification for the first tangible financial instrument.

In another general aspect, the method of validating the financial instrument comprises the step of scanning, by an optical scanner of a financial instrument validation system, a first tangible financial instrument comprising a first readable security graphic and a first account identifier. The method also comprises the step of decoding, with a processor of the financial instrument validation system, the first readable security graphic scanned by the optical scanner to identify a first token for the first tangible financial instrument. The method also comprises the step of identifying, by the processor, the first account identifier scanned by the optical scanner. The method also comprises the step of transmitting, via an electronic data network, by the financial instrument validation system, the first token and the first account identifier to a host server system. The method also comprises the step of validating, by the host server system, the first token. The method also comprises the step of retrieving, by the host server system, from the one or more databases, the private key associated with the first account identifier and a first tokenizable data associated with at least one of the private key associated with the first account identifier or the first account identifier. The method also comprises the step of de-tokenizing, by the host server system, with the private key associated with the first account identifier, the first token to obtain a first de-tokenized data. The method also comprises the step of comparing, by the host server system, the first tokenizable data with the first de-tokenized data. The method also comprises the step of determining, based on the comparing, that the first token is valid. The method also comprises the step of generating, by the host server system, and issuing, by the host server system, an approval notification for the first tangible financial instrument.

In another general aspect, the method of validating the financial instrument comprises the step of scanning, by an optical scanner of a financial instrument validation system, a first tangible financial instrument comprising a second readable security graphic and a second account identifier. The method also comprises the step of decoding, with a processor of the financial instrument validation system, the second readable security graphic scanned by the optical scanner to identify a second token for the second tangible financial instrument. The method also comprises the step of identifying, by the processor, the second account identifier scanned by the optical scanner. The method also comprises the step of transmitting, via an electronic data network, by the financial instrument validation system, the second token and the second account identifier to a host server system. The method also comprises the step of validating, by the host server system, the second token. The method also comprises the step of retrieving, by the host server system, from the one or more databases, the private key associated with the second account identifier and a second tokenizable data associated with at least one of the private key associated with the second account identifier or the second account identifier. The method also comprises the step of de-tokenizing, by the host server system, with the private key associated with the second account identifier, the second token to obtain a second de-tokenized data. The method also comprises the step of comparing, by the host server system, the second tokenizable data with the second de-tokenized data. The method also comprises the step of determining, based on the comparing, that the second token is invalid. The method also comprises the step of generating, by the host server system, and issuing, by the host server system, a warning notification for the second tangible financial instrument.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages.

The disclosed embodiments are therefore intended to include all such modifications, alterations, and adaptations without departing from the scope of the embodiments as set forth herein.

What is claimed is:

1. A system for validating a first tangible financial instrument, the first tangible financial instrument comprising a first readable security graphic and a first account identifier, wherein the first readable security graphic is decodable to a first public key for the first tangible financial instrument, the system comprising:
a financial instrument validation system comprising:
an optical scanner configured to detect and scan readable security graphics and account identifiers on financial instruments;
a first processor in communication with the optical scanner, wherein the first processor is configured to:
decode the first readable security graphic scanned by the optical scanner to identify the first public key for the first tangible financial instrument;
identify the first account identifier scanned by the optical scanner; and
communicate the first public key and the first account identifier to a host server system;
the host server system comprising one or more servers in communication with the financial instrument validation system via an electronic data network, the one or more servers comprising:
one or more databases storing a plurality of financial instrument public keys, a plurality of private keys, and a plurality of account identifiers, wherein each of the plurality of financial instrument public keys is for a financial instrument of an account of an account holder of a financial institution, wherein one or more of the plurality of financial instrument public keys is paired with a private key that is associated with the account of the account holder, and wherein each of the plurality of account identifiers is associated with an account of an account holder of the financial institution, and wherein each of the private keys is associated in the one or more databases with one of the plurality of account identifiers;
a second processor in communication with the one or more databases, wherein the second processor is configured to:
receive, from the financial instrument validation system, the first public key and the first account identifier;
retrieve, from the one or more databases, a first private key associated with the first account identifier;
compare the private key associated with the first account identifier with the first public key;
upon a determination that the first private key associated with the first account identifier is paired with the first public key, generate and issue an approval notification to the financial instrument validation system for the first tangible financial instrument; and:
upon a determination that the first private key associated with the first account identifier is not paired with the first public key, generate and issue a warning notification to the financial instrument validation system for the first tangible financial instrument.

2. The system of claim 1, wherein the first readable security graphic comprises a quick response code printed on the first tangible financial instrument.

3. The system of claim 2, wherein the first tangible financial instrument comprises a check.

4. The system of claim 1, wherein the first readable security graphic comprises a hash string.

5. The system of claim 1, wherein the first readable security graphic comprises a quick response code and a hash string.

6. The system of claim 1, wherein the first account identifier comprises an account readable security graphic, and wherein the account readable security graphic is decodable to account identifying information associated with an account of an account holder.

7. The system of claim 1, wherein the plurality of private keys, the plurality of account identifiers, and the plurality of financial instrument public keys are stored on a first database of the host server system.

8. The system of claim 1, wherein the plurality of private keys and the plurality of account identifiers are stored on a first database of the host server system, and wherein the plurality of financial instrument public keys is stored on a second database of the host server system.

9. The system of claim 1, wherein the second processor is further configured to compare the first private key associated with the first account identifier with the first public key; by:
generating a first authentication data;
generating a first encrypted authentication data, wherein the first encrypted authentication data is generated by encrypting, with the first public key, the first authentication data;
generating a first decrypted authentication data, wherein the first decrypted authentication data is generated by decrypting, with the first private key associated with the first account identifier, the first encrypted authentication data;
comparing the first decrypted authentication data with the first authentication data;
determining, upon a match resulting from a comparison of the first decrypted authentication data with the first authentication data, that the first public key is paired with the first private key associated with the first account identifier; and
determining, upon a mismatch resulting from a comparison of the first decrypted authentication data with the first authentication data, that the first public key is not paired with the first private key associated with the first account identifier.

10. A method for validating financial instruments, the method comprising:
scanning, by an optical scanner of a financial instrument validation system, a first tangible financial instrument comprising a first readable security graphic and a first account identifier;
decoding, with a processor of the financial instrument validation system, the first readable security graphic scanned by the optical scanner to identify a first public key for the first tangible financial instrument;
identifying, by the processor, the first account identifier scanned by the optical scanner;
transmitting, via an electronic data network, by the financial instrument validation system, the first public key and the first account identifier to a host server system, wherein the host server system comprises:
one or more databases storing a plurality of financial instrument public keys, a plurality of private keys, and a plurality of account identifiers, wherein each of the plurality of financial instrument public keys is for a financial instrument of an account of an account holder of a financial institution, wherein one or more of the plurality of financial instrument public keys is paired with a private key that is associated with the account of the account holder, and wherein each of the plurality of account identifiers is associated with an account of an account holder of the financial institution, and wherein each of the private keys is associated in the one or more databases with one of the plurality of account identifiers;

retrieving, by the host server system, from the one or more databases, a first private key associated with the first account identifier;

comparing, by the host server system, the first private key associated with the first account identifier with the first public key;

determining, based on the comparing, that the first private key associated with the first account identifier is paired with the first public key;

generating, by the host server system, and issuing, by the host server system, to the financial instrument validation system, an approval notification, for the first tangible financial instrument;

scanning, by the optical scanner, a second tangible financial instrument comprising a second readable security graphic and a second account identifier;

decoding, with the processor of the financial instrument validation system, the second readable security graphic scanned by the optical scanner to identify a second public key for the second tangible financial instrument;

identifying, by the processor, the second account identifier scanned by the optical scanner;

transmitting, via the electronic data network, by the financial instrument validation system, the second public key and the second account identifier to the host server system;

retrieving, by the host server system, from the one or more databases, a second private key associated with the second account identifier;

comparing, by the host server system, the second private key associated with the second account identifier with the second public key;

determining, based on the comparing, that the second private key associated with the second account identifier is not paired with the second public key; and generating, by the host server system, and issuing, by the host server system, to the financial instrument validation system, a warning notification for the second tangible financial instrument.

11. The method of claim 10, wherein the first readable security graphic comprises a quick response code printed on the first tangible financial instrument.

12. The method of claim 11, wherein the first tangible financial instrument comprises a check.

13. The method of claim 10, wherein the first readable security graphic comprises a hash string.

14. The method of claim 10, wherein the first readable security graphic comprises a quick response code and a hash string.

15. The method of claim 10, wherein the first account identifier comprises an account readable security graphic, and wherein the account readable security graphic is decodable to account identifying information associated with an account of an account holder.

16. The method of claim 10, wherein the plurality of private keys, the plurality of account identifiers, and the plurality of financial instrument public keys are stored on a first database of the host server system.

17. The method of claim 10, wherein the plurality of private keys and the plurality of account identifiers are stored on a first database of the host server system, and wherein the plurality of financial instrument public keys is stored on a second database of the host server system.

18. The method of claim 11, wherein:

comparing, by the host server system, the first private key associated with the first account identifier with the first public key comprises:

generating a first authentication data;

generating a first encrypted authentication data, wherein the first encrypted authentication data is generated by encrypting, with the first public key, the first authentication data;

generating a first decrypted authentication data, wherein the first decrypted authentication data is generated by decrypting, with the first private key associated with the first account identifier, the first encrypted authentication data;

comparing the first decrypted authentication data with the first authentication data; and determining, upon a match resulting from a comparison of the first decrypted authentication data with the first authentication data, that the first public key is paired with the first private key associated with the first account identifier; and comparing, by the host server system, the second private key associated with the second account identifier with the second public key comprises:

generating a second authentication data;

generating a second encrypted authentication data, wherein the second encrypted authentication data is generated by encrypting, with the second public key, the second authentication data;

generating a second decrypted authentication data, wherein the second decrypted authentication data is generated by decrypting, with the second private key associated with the second account identifier, the second encrypted authentication data;

comparing the second decrypted authentication data with the second authentication data; and determining, upon a mismatch resulting from a comparison of the second decrypted authentication data with the second authentication data, that the second public key is not paired with the second private key associated with the second account identifier.

\* \* \* \* \*